UNITED STATES PATENT OFFICE.

JOHAN E. MILLS, OF CHICAGO, ILLINOIS.

COMPOSITION OF MATTER FOR TEMPERING.

SPECIFICATION forming part of Letters Patent No. 503,801, dated August 22, 1893.

Application filed March 3, 1893. Serial No. 464,568. (No specimens).

*To all whom it may concern:*

Be it known that I, JOHAN E. MILLS, a citizen of the United States, residing at Chicago, in the county of Cook and State of Illinois, have invented a certain new and useful Composition of Matter for Tempering; and I do hereby declare the following to be a full, clear, and exact description of the invention, such as will enable others skilled in the art to which it appertains to make and use the same.

My invention relates to a composition of matter for tempering steel, and consists of the following ingredients, combined in the manner and proportions, stated, namely: First, I mix one (1) bushel of oak ashes with fifteen gallons of water, and then boil the mixture until two and a half (2½) gallons are left. To this mixture I then add five (5) pounds of tallow, one (1) pound of slaked lime and three (3) pounds of salt. This mixture is then boiled one (1) hour, after which it is allowed to cool, and then I add one quarter (¼) of a pound of ground horn and one (1) ounce of cyanide of potash, to every pound of the mixture that remains. The composition is then ready for use, and will be of a consistency somewhat resembling beeswax.

The manner in which the composition is used in tempering steel is as follows:—The piece to be tempered is first heated until it is a copper red, whereupon it is removed from the fire and entirely coated with my composition and then replaced in the fire and subjected to ordinary heat, after which it is cooled by being placed in cold water, when it will be found to be tempered.

Among the advantages I claim is, that the tempering of steel will not require skilled labor, for with my composition any one can carry on the tempering operation, and further the quickness with which the operation can be accomplished in comparison with the method generally followed makes its use desirable. It also avoids the danger of cracking the steel as the composition prevents such cracking and will also prevent any cracks from opening should there be any in the piece being tempered. The composition also adds strength to the steel by reason of the ingredients of which it is composed.

Another advantage I claim is that by the use of this composition in tempering, the twisting or springing of the metal is entirely avoded, and again I am enabled to temper what is known as merchants' steel which heretofore has been impossible.

I claim as my invention—

The herein-described composition of matter for the purpose set forth consisting of oak ashes, water, tallow, slaked lime, salt, ground horn and cyanide of potash combined in the proportions set forth.

In testimony whereof I affix my signature in presence of two witnesses.

JOHAN E. MILLS.

Witnesses:
HARRY COBB KENNEDY,
RUDOLPH W. LOTZ.